(12) United States Patent
Mori (10) Patent No.: US 7,680,598 B2
(45) Date of Patent: Mar. 16, 2010

(54) INFORMATION GENERATING APPARATUS, RECORDING MEDIUM WHERE INFORMATION GENERATING PROGRAM IS RECORDED, AND INFORMATION GENERATING METHOD

(75) Inventor: Kouji Mori, Meguro-ku (JP)

(73) Assignees: Pioneer Corporation, Tokyo (JP); Increment P Corporation, Tokyo (JP)

( * ) Notice: Subject to any disclaimer, the term of this patent is extended or adjusted under 35 U.S.C. 154(b) by 332 days.

(21) Appl. No.: 11/790,162

(22) Filed: Apr. 24, 2007

(65) Prior Publication Data

US 2007/0250265 A1     Oct. 25, 2007

(30) Foreign Application Priority Data

Apr. 24, 2006    (JP)    ............................ 2006-118842

(51) Int. Cl.
G01C 21/30     (2006.01)

(52) U.S. Cl. ...................... 701/211; 701/200; 701/207; 701/212; 340/988; 340/995.1

(58) Field of Classification Search ................. 701/200, 701/201, 207, 208, 209–212; 340/988, 990, 340/995.1
See application file for complete search history.

(56) References Cited

U.S. PATENT DOCUMENTS 5,848,373 A * 12/1998 DeLorme et al. ............ 701/200
6,128,571 A * 10/2000 Ito et al. ...................... 701/201

FOREIGN PATENT DOCUMENTS

JP          8-292054 A     11/1996

* cited by examiner

*Primary Examiner*—Gertrude Arthur Jeanglaud
(74) *Attorney, Agent, or Firm*—Sughrue Mion, PLLC (57) ABSTRACT

When an in-link type of in-link attribute data is a tunnel, a system controller specifies the positions of both ends of a tunnel on the basis of a annotation true position shape of the in-link attribute data, and generates annotation data for displaying a tunnel symbol for each of the specified both ends.

11 Claims, 9 Drawing Sheets

FIG.2A

| OBJECT ID |
|---|
| ANNOTATION CHARACTER STRING |
| THE LENGTH OF ANNOTATION CHARACTER STRING |
| ANNOTATION TYPE |
| SCALE-1 DISPLAY TYPE |
| SCALE-2 DISPLAY TYPE |
| SCALE-3 DISPLAY TYPE |
| SCALE-4 DISPLAY TYPE |
| TRUE POSITION SHAPE |

FIG.2B

| OBJECT ID |
|---|
| FONT SIZE |
| CORRESPONDING ANNOTATION CHARACTER ID |
| CHARACTER STRING SHAPE |

| OBJECT ID |
|---|
| ROAD TYPE |
| START POINT NODE ID |
| END POINT NODE ID |
| NATIONAL/PREFECTURAL ROAD NUMBER |
| ROAD NAME |
| ROAD LINK SHAPE |

FIG.5

| OBJECT ID |
|---|
| IN-LINK TYPE |
| CORRESPONDING LINK ID |
| SAME LINK ATTRIBUTE ID |
| IN-LINK ATTRIBUTE SHAPE |

ANNOTATION TYPES

| TUNNEL (HIGHWAY ROAD) |
| TUNNEL (URBAN EXPRESS WAY) |
| TUNNEL (TOLL NATIONAL ROAD) |
| TUNNEL (NATIONAL ROAD) |
| TUNNEL (TOLL MAIN ROAD) |
| TUNNEL (MAIN ROAD) |
| TUNNEL (TOLL PREFECTURAL ROAD) |
| TUNNEL (PREFECTURAL ROAD) |
| TUNNEL (OTHER TOLL ROADS) |
| TUNNEL (OTHER ROADS) |

HIGH ↑ PRIORITY ↓ LOW

INFORMATION GENERATING APPARATUS, RECORDING MEDIUM WHERE INFORMATION GENERATING PROGRAM IS RECORDED, AND INFORMATION GENERATING METHOD

BACKGROUND OF THE INVENTION

1. Field of the Invention

The present invention relates to the technical field of an information generating apparatus, a recording medium where an information generating program is recorded, and an information generating method for generating, at the time of displaying a map image including a road, symbol data for displaying a symbol indicative of a start point or end point of a facility provided along a road, in a position where the start point or end point of the facility exists.

2. Related Background Art

Hitherto, a navigation system is known, navigating a vehicle by displaying, on a screen, a road map of a peripheral area including the present position of the vehicle, a route to the destination of the vehicle, and the like.

In such a navigation system, at the time of displaying a road map on the screen, generally, information such as map symbols, the name and related information of a feature, the name of a road, and the like is displayed together with images of the background and roads.

As such information, for example, the symbol of a facility provided along a road, such as tunnel, bridge, railroad crossing, or the like is also displayed. For example, Japanese Unexamined Patent Publication No. H8-292054 discloses an in-vehicle path searching apparatus displaying a flag indicative of an entrance or exit in the position of the entrance or exit of a tunnel existing on a path to a destination.

Such a symbol or character information is called a annotation or the like. Information is displayed as described above on the basis of annotation data specifying data of the annotation, display position, and the like.

Map data used for displaying a road map on a screen and navigating a vehicle include not only the annotation data but also various data such as node data specifying information of a branch point or the like, link data specifying the position, shape, connection, and the like of a road, and background data specifying the position, shape, and the like of a feature, and the amount of the data is enormous.

Consequently, map data are often maintained by a group (of people) which is assigned to each of the data. For example, the road link data, the node data, and the like are maintained by a road data creation group, and the annotation data, the background data, and the like are maintained by a map creation group.

Facilities above provided along roads such as tunnels, bridges, and railroad crossings are information which can be also referred to as attributes indicative of the features in one aspect of the roads. Facility data that define information of the facilities are often defined, for example, in link data itself or defined in correspondence with the link data. Consequently, in many cases, the facility data are maintained by the road data creation group. Therefore, after addition, change, erasure, or the like of the information of a facility is performed by the road data creation group, the map creation group has to match annotation data to the corrected data.

However, for example, to maintain the annotation data of a tunnel, a bridge, or the like, the map creation group manually refers to the facility data, recognizes the position of the entrance and exit of the tunnel or the like, and adjusts the position of the annotation to the position. Consequently, the cost required for maintaining the annotation data is excessively high.

In the case of displaying a road map on a plurality of scales, considering viewability of the road map and the like, in some cases, a specification of whether a annotation is displayed or not is preliminarily determined on each of the scales in accordance with the length, kind, and the like of a tunnel or the like. However, when annotation data are manually maintained, whether the annotation data are displayed or not is determined from a personal viewpoint of each of persons in charge, so that annotation data may not be generated to the specifications.

The present invention has been achieved from the above points and an object of the invention is to provide an information generating apparatus, a recording medium where an information generating program is recorded, and an information generating method for efficiently and properly generating symbol data such as annotation data for displaying a symbol such as a annotation in a position where the start point or end point of a facility such as a tunnel provided along a road exists.

SUMMARY OF THE INVENTION

In order to solve the above problems, the invention according to claim 1 relates to an information generating apparatus for, when a map image including a road is displayed on the basis of map data, generating symbol data for displaying a symbol indicative of an end point of a predetermined facility provided along a road, in a position where at least one of points of a starting point and an ending point of the facility exists, wherein the map data include road data specifying position and shape of a road and facility data associated with the road data and having position information and shape information of the predetermined facility provided along at least a part of a road to which the road data correspond, and the apparatus comprises:

an end point specifying device which specifies the position of an end point of the predetermined facility on the basis of the position information and the shape information of the facility data; and a generating device which generates the symbol data in correspondence with the specified position of the end point.

In order to solve the above problems, the invention according to claim 6 relates to a recording medium where an information generating program is recorded so as to be able to be read by a computer included in an information generating apparatus, wherein, when a map image including a road is displayed on the basis of map data which include road data specifying position and shape of a road and facility data associated with the road data and having position information and shape information of a predetermined facility provided along at least a part of a road to which the road data correspond, the information generating apparatus generates symbol data for displaying a symbol indicative of an end point of the predetermined facility in a position where at least one of points of a starting point and an ending point of the facility exists, wherein the program makes the computer function as:

an end point specifying device which specifies the position of an end point of the predetermined facility on the basis of the position information and the shape information of the facility data; and a generating device which generates the symbol data in correspondence with the specified position of the end point.

In order to solve the above problems, the invention according to claim 7 relates to an information generating method of, when a map image including a road is displayed on the basis of map data, generating symbol data for displaying a symbol indicative of an end point of a predetermined facility provided along a road, in a position where at least one of points of a starting point and an ending point of the facility exists, wherein the map data include road data specifying position and shape of a road and facility data associated with the road data and having position information and shape information of the predetermined facility provided along at least a part of a road to which the road data correspond, and the method comprises:

an end point specifying process of specifying the position of an end point of the predetermined facility on the basis of the position information and the shape information of the facility data; and a generating process of generating the symbol data in correspondence with the specified position of the end point.

BRIEF DESCRIPTION OF THE DRAWINGS

FIGS. 2A and 2B are diagrams showing a configuration example of annotation data.

DETAILED DESCRIPTION OF THE PREFERRED EMBODIMENTS

An embodiment of the present invention will be described in detail hereinbelow with reference to the drawings. The following embodiment relates to a case of applying the invention to a annotation data generating apparatus for generating annotation data for displaying a annotation symbol indicative of the exit or entrance of a tunnel in a navigation system on a road map. In the following description, the exit and entrance of a tunnel are simply called tunnel mouths.

1. Configuration, Function, and the Like of Annotation Data Generating Apparatus First, the configuration and function of a annotation data generating apparatus S of the embodiment will be described with reference to FIGS. 1 to 9.

Figure 1:
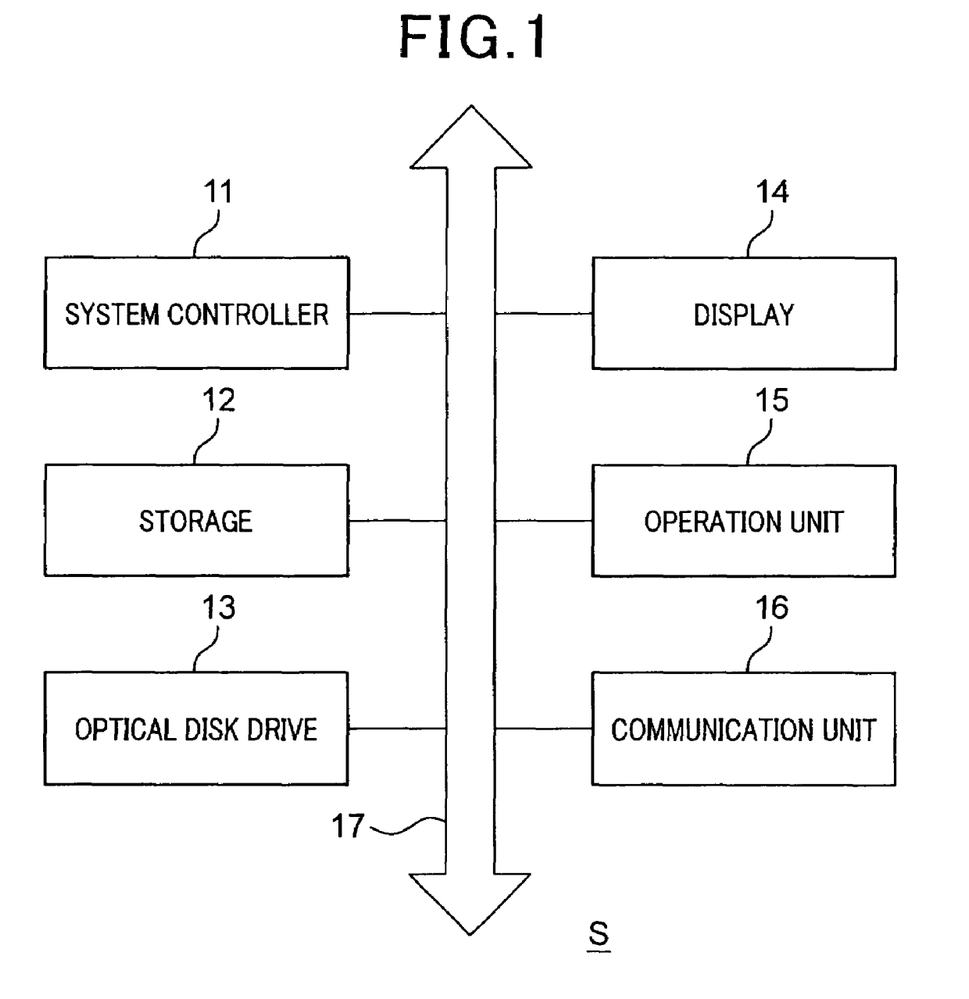
FIG. 1 is a diagram showing an example of a schematic configuration of a annotation data generating apparatus S of an embodiment of the present invention.

FIG. 1 is a diagram showing an example of a schematic configuration of the annotation data generating apparatus S of the embodiment.

As shown in FIG. 1, the annotation data generating apparatus S includes: a system controller 11 having a CPU (Central Processing Unit), a RAM (Random Access Memory), a ROM (Read Only Memory), and the like; a storage 12 (for example, a hard disc drive or the like) for storing various programs, data, and the like; an optical disk drive 13 for reading data or the like from an optical disc such as a CD (Compact Disc) or DVD (Digital Versatile Disc) and recording data to a write-once or rewritable optical disc; a display 14 (such as a CRT (Cathode Ray Tube) display, a liquid crystal display, or the like) for displaying information of characters, an image, and the like; an operation unit 15 (such as a keyboard, a mouse, and the like) for receiving an operation instruction from the user and outputting the instruction as an instruction signal to the system controller 11; and a communication unit 16 connected to a network such as a LAN (Local Area Network) and the like and controlling a state of communication with other computers. The controller 11 and the components are connected to each other via a system bus 17.

The system controller 11 corresponds to an example of an end point specifying device, a facility length specifying device, a determining device, and a generating device of the present invention.

As the data generating apparatus S, for example, a personal computer, a workstation, or the like can be applied.

In the storage 12, a map database (an example of map data) for displaying a road map is configured by a navigation system. The map database undergoes maintenance such as generation, change, modification, and the like by an operation on the annotation data generating apparatus S by a creator, or by a remote control of a computer connected to the annotation data generating apparatus S via a network. The completed map data are recorded on a DVD or the like and properly read by a predetermined navigation system or the like, and a road map is displayed on the basis of the read data.

The map database includes various data such as annotation data as an example of the symbol data, link data as an example of the road data, in-link attribute data as an example of the facility data, node data, and background data. Each of the data pieces is stored, for example, in meshes obtained by dividing an area to be displayed as a road map into rectangular areas at predetermined intervals in the latitude direction and the longitude direction.

Figure 2A:
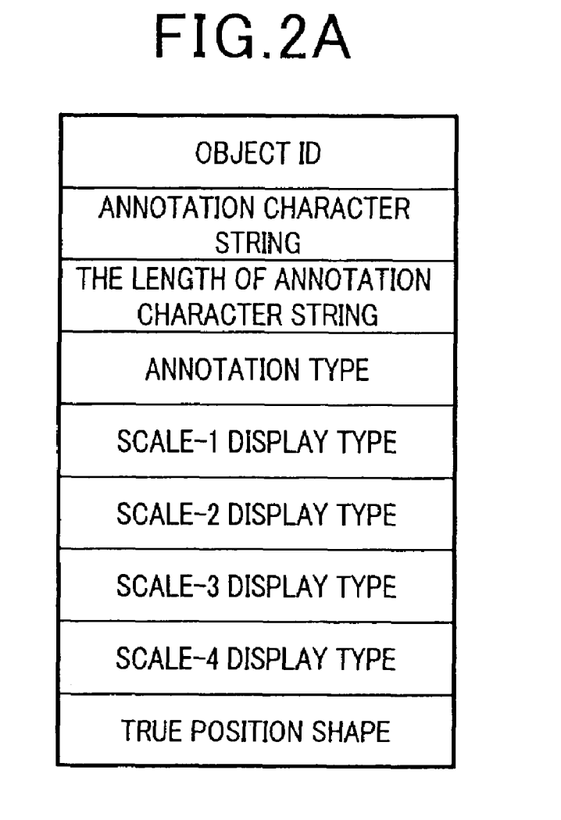
FIG. 2A shows annotation true position data.
Figure 2B:
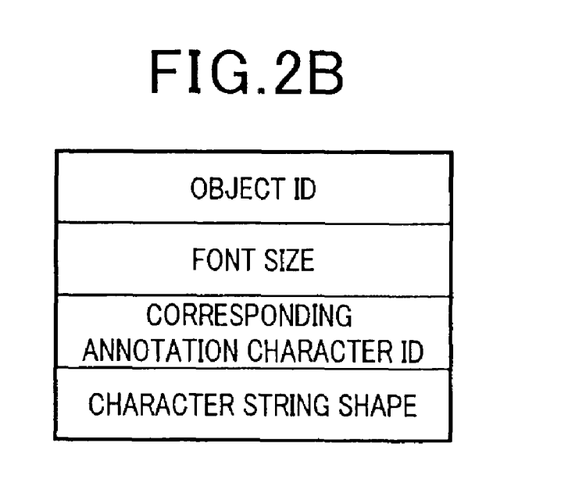
FIG. 2B shows display character string data.

FIGS. 2A and 2B are diagrams showing a configuration example of the annotation data. FIG. 2A shows annotation true position data, and FIG. 2B shows display character string data.

The annotation data are information used for displaying a annotation on a map and include the annotation true position data shown in FIG. 2A and display character string data shown in FIG. 2B.

The annotation true position data are constructed by, as shown in FIG. 2A, an object ID, a annotation character string, the number of annotation characters, a annotation type as an example of symbol type information, a scale-1 display type as an example of display presence/absence information, a scale-2 display type, a scale-3 display type, a scale-4 display type, and a true position shape.

The object ID is identification information assigned uniquely to each annotation. The annotation character string is character string information expressing the name of a feature, explanation, or the like at the time of displaying the name or the like on a map. The number of annotation characters is numerical value information expressing the number of characters of the annotation character string. In the case where the annotation character string is not displayed on a map depending on the annotation type which will be described later, the annotation character string and the number of annotation characters may not be set.

The annotation type is information indicating whether a annotation is a annotation expressing the kind of an object to be explained by the annotation corresponding to the annotation true position data. As the annotation types, for example, air ports, police stations, universities, shrines, subway line names, main intersections, tunnels, bridges, and the like are set. When the annotation type is a tunnel, the detailed type such as a highway road, urban express way, toll national road, or the like is set (the detail will be described later). In the case of using a symbol as a annotation, the annotation type is used as information for specifying the kind (design) of a symbol to be displayed.

The scale-1 display type, scale-2 display type, scale-3 display type, and scale-4 display type are information indicative of node display modes in the case of displaying a road map at a scale corresponding to each of the scales 1 to 4. For example, the scales 1, 2, 3, and 4 correspond to 1:100,000, 1:50,000, 1:25,000, and 1:12,500, respectively. The number of scales may be three or less, or five or more.

As the display types, for example, "no display", "symbol only", "character string only", "symbol+character string", and "instruction point+character string" are set. "No display" indicates that no annotation corresponding to the annotation true position data is displayed at the scale. "Symbol only" indicates that only a symbol indicative of an object to be annotated is displayed in the true position of the object to be annotated (the correct position on a map of the object or the like). "Character string only" indicates that only a annotation character string is displayed. "Symbol+character string" expresses that a symbol indicative of the object to be annotated is displayed in the true position of the object to be annotated, and a annotation character string is displayed around the symbol. "Instruction point+character string" expresses that a annotation character string is displayed and a leader line extending from the true position of an object to be annotated to the annotation character string. The display type to be set is preliminarily determined by the annotation type. For example, when the annotation type is a road name, "no display" or "character string only" is set. When the annotation type is a tunnel, "no display" or "symbol only" is set. The display type of a scale which is set for a tunnel mouth may be changed, for example, according to the tunnel length (for example, when the tunnel length is 800 m or more, "no display" or "symbol+character string" is set and, when the tunnel length is less than 800 m, "no display" or "only symbol" is set). The display type of scale may be changed according to the display type (for example, when the scale is the scale 1 to 3, "no display" or "symbol" and, when the scale is the scale 4, "no display" or "instruction point+character string").

The true position shape is information that the true position of an object to be annotated is expressed by, for example, a relative coordinate string from a predetermined reference position on a mesh to which the annotation belongs.

As shown in FIG. 2B, the display character string data are constructed by an object ID, a font size, a corresponding annotation character ID, a character string shape, and the like.

The object ID is identification information assigned uniquely to each of display character string data. The font size is information indicative of the size of a annotation character string displayed on a map. The corresponding annotation character ID is information specifying annotation true position data corresponding to the display character string data and, for example, an object ID of a annotation position data is set. The character string shape is information indicative of the shape of a region or the like where a annotation character string is displayed. Since the display character string data are data used only in the case where the display type of the annotation true position data are "character string only" or "symbol+character string", it is unnecessary to generate display character string data for annotation true position data of a annotation type for which a annotation character string is not displayed (in any of the display types, "character string only" and "symbol+character string" is not set).

Prior to description of link data and in-link attribute data, the basic concept of a link and an in-link attribute will be described.

Figure 3:
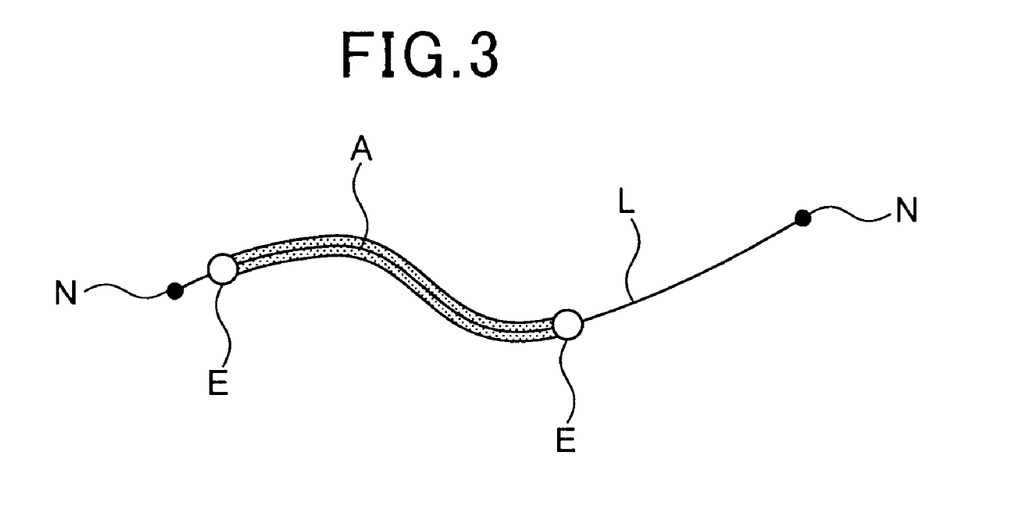
FIG. 3 is a diagram showing an example of the concept of a link, an in-link attribute, and a node.

FIG. 3 is a diagram showing an example of the concept of a link, in-link attributes, and a node.

As shown in FIG. 3, nodes N indicate a branch point, a junction point and an intersection point of a road, a road state change point, and the like. A link L indicates a road itself, and the nodes N are positioned at both ends of the road. An in-link attribute A corresponds to part or all of the link L and expresses the attribute of a road part of the corresponding link L. The attribute is different from information indicative of the features of a road itself such as the type, shape, width, the number of lanes, and the like of the road, but indicates the kind of a facility provided along a road such as tunnel, bridge, cave mouth, railroad crossing, underpass, or the like. Reference character E in the diagram indicates end points of the in-link attribute A, that is, the start and end points of the in-link attribute A. In the case where the in-link attribute A is a tunnel, the endpoint is a tunnel mouth. It is also possible to make a plurality of in-link attributes A correspond to one link L.

Figure 4:
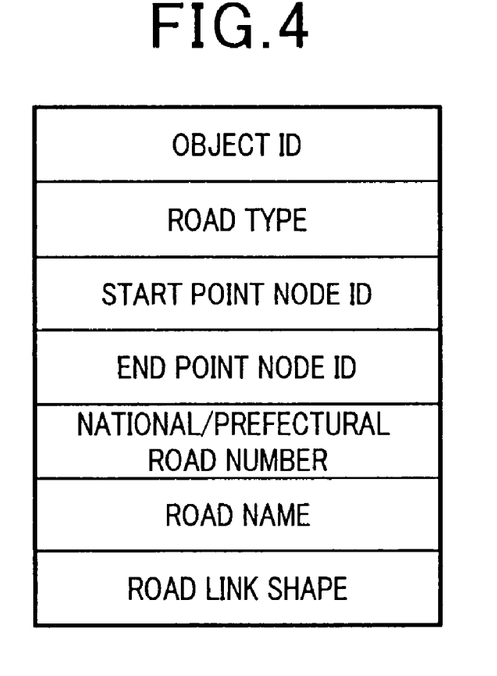
FIG. 4 is a diagram showing a configuration example of link data.

FIG. 4 is a diagram showing a configuration example of link data.

The link data are data specifying the details of the link L. As shown in FIG. 4, the link data are constructed by object ID, road type as an example of road type information, start point node ID, end point node ID, national/prefectural road number, road name, road link shape, and the like.

The object ID is identification information assigned uniquely to each of the links L. The road type is information of the type of a road to which the link L corresponds. For example, as the road type, highway road, national road, prefectural road, toll road, or the like is set. The start point node ID is identification information for specifying a node positioned at the start point of a link L, and the end point node ID is identification information for specifying a node positioned at the endpoint of a link L. As the start/end node ID, for example, the node ID is set. The national/prefectural road number is information of a number showing the road number when a road to which the link L corresponds is a national or prefectural road. The road name is information of a text showing the name given to the road to which the link L corresponds (for example, XX street). The road link shape is information expressing the position and shape of the road to which the link L corresponds by, for example, a relative coordinate string or the like from a predetermined reference position on a mesh to which the link L belongs.

Figure 5:
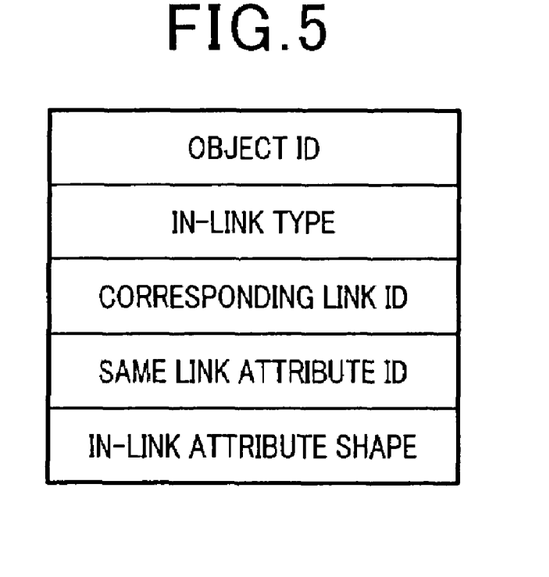
FIG. 5 is a diagram showing a configuration example of in-link attribute data.

FIG. 5 is a diagram showing a configuration example of the in-link attribute data.

The in-link attribute data are data specifying the details of the link attribute A. As shown in FIG. 5, the link attribute data are constructed by object ID, in-link type, corresponding link ID, same link attribute ID as an example of group identification information, in-link attribute shape as an example of position information and shape information, and the like.

The object ID is identification information assigned uniquely to each of the in-link attributes A. The in-link type is information of the kind of an attribute of a road part to which the in-link attribute data correspond. For example, roughly, tunnel, bridge, cave mouth, railroad crossing, underpass, and the like are set. The corresponding link ID is information for specifying the link L with which the in-link attribute A is associated and, for example, the object ID of the link L is set.

The same link attribute ID is identification information assigned uniquely to one group (one facility) constructed by a plurality of in-link attributes A. For example, the same link attribute ID is set in the case where a plurality of small tunnels are lined and one name is given to the series of tunnels or in the case where the interval between tunnels is short so that a plurality of tunnels are desired to be handled as one tunnel.

The in-link attribute shape is information expressing the position and shape of an attribute to which the in-link attribute A corresponds by, for example, a relative coordinate string from a predetermined reference position on a mesh to which the in-link attribute A belongs. The in-link attribute shape basically matches the road link shape of a corresponding road part in the link L to which the in-link attribute A is associated.

The node data are data specifying the details of the node N and is constructed by, for example, node ID assigned uniquely to each of the nodes N, connection link information specifying a link L connected via the node N, node coordinates indicative of the position or the like on the map of the node, and the like. The background data are information expressing the display position, shape, and the like of a feature displayed on the map.

The system controller 11 controls the whole data generating apparatus S by reading and executing various programs (such as an information generating program) stored in the ROM and the storage 12. The system controller 11 also functions as an end point specifying device, an attribute length specifying device, a determining device, and a generating device.

Figure 6:
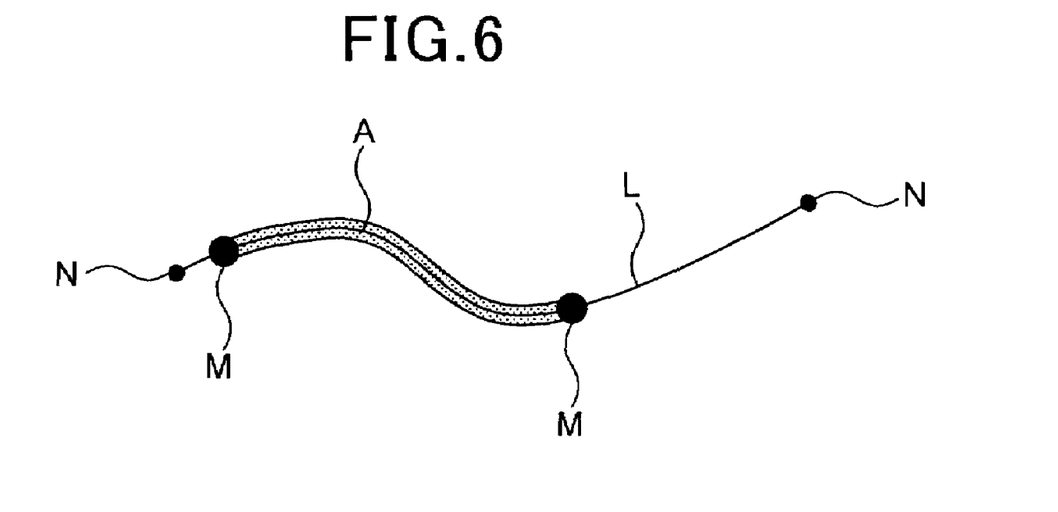
FIG. 6 is a diagram showing a display example of a tunnel symbol.
Figure 7A:
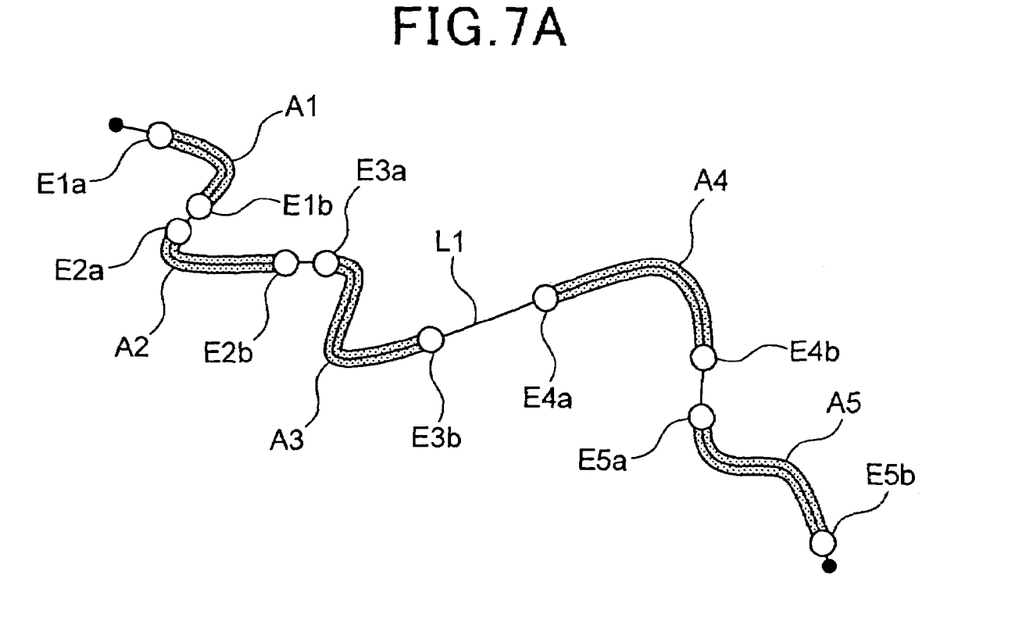
FIGS. 7A and 7B are diagrams showing a display example of a tunnel symbol in the case where a same in-link attribute ID is set.
Figure 7B:
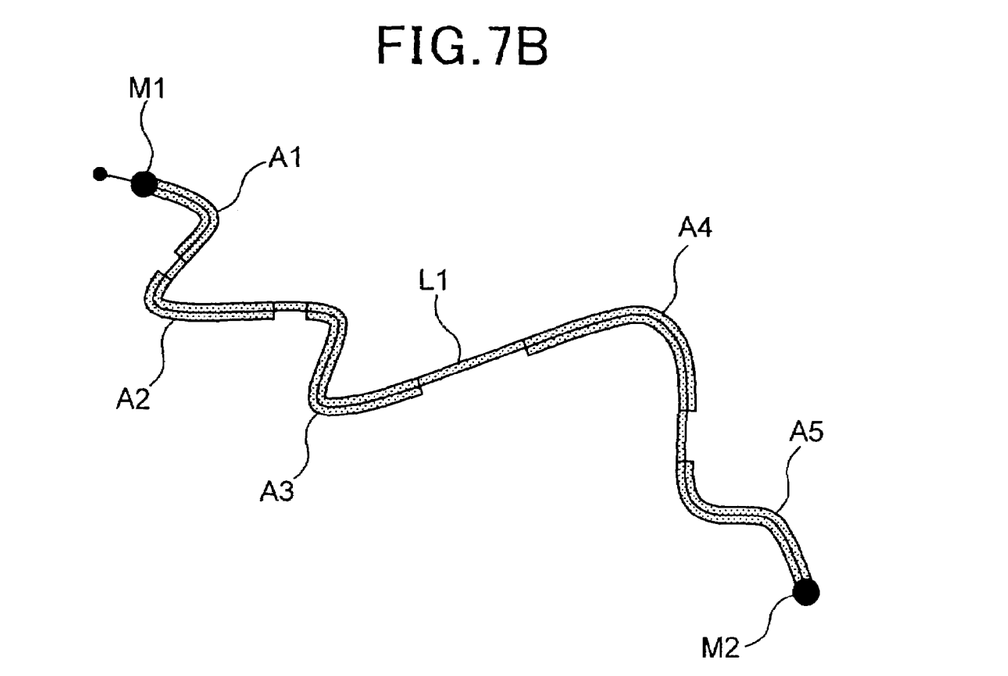
Figure 8:
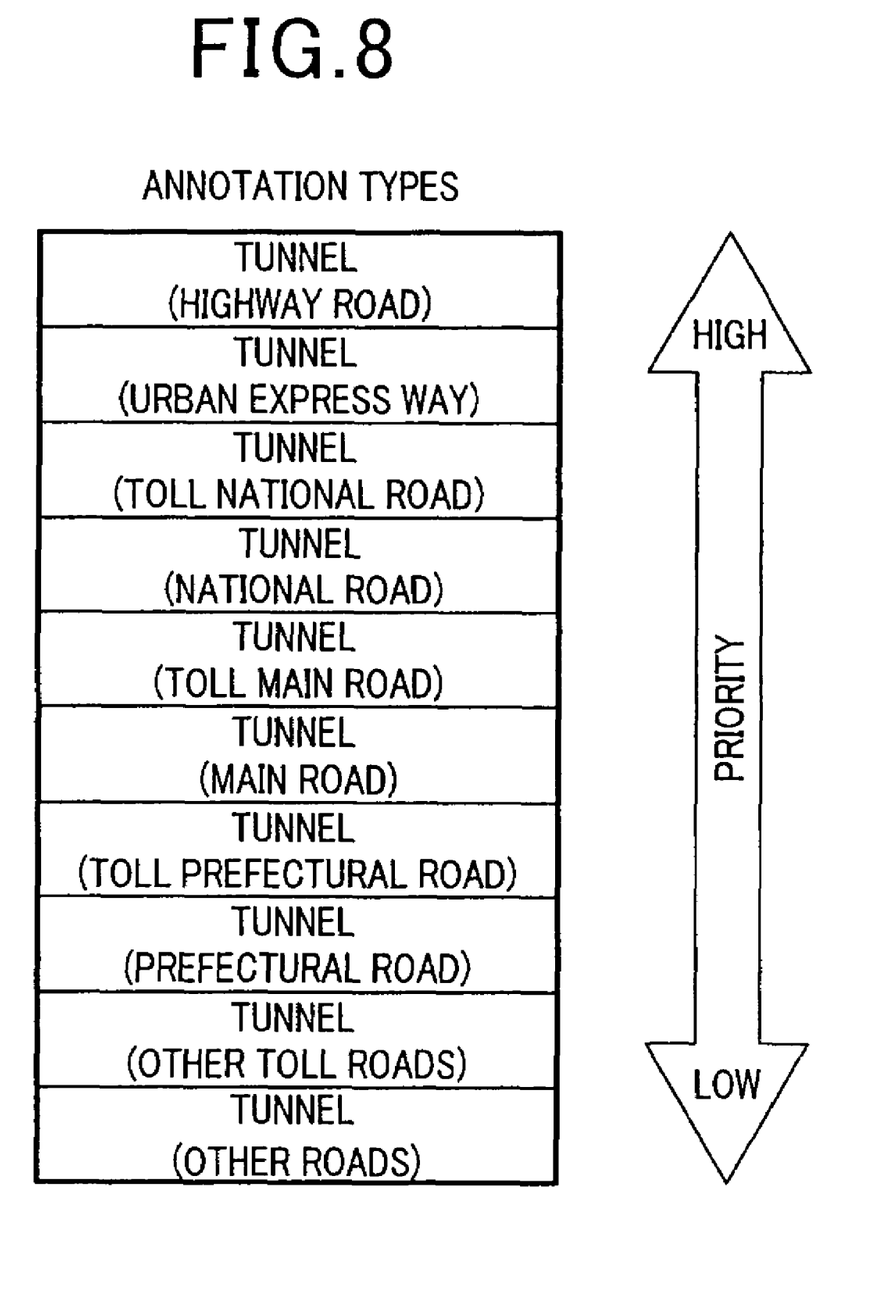
FIG. 8 is a diagram showing an example of setting annotation types.
Figure 9A:
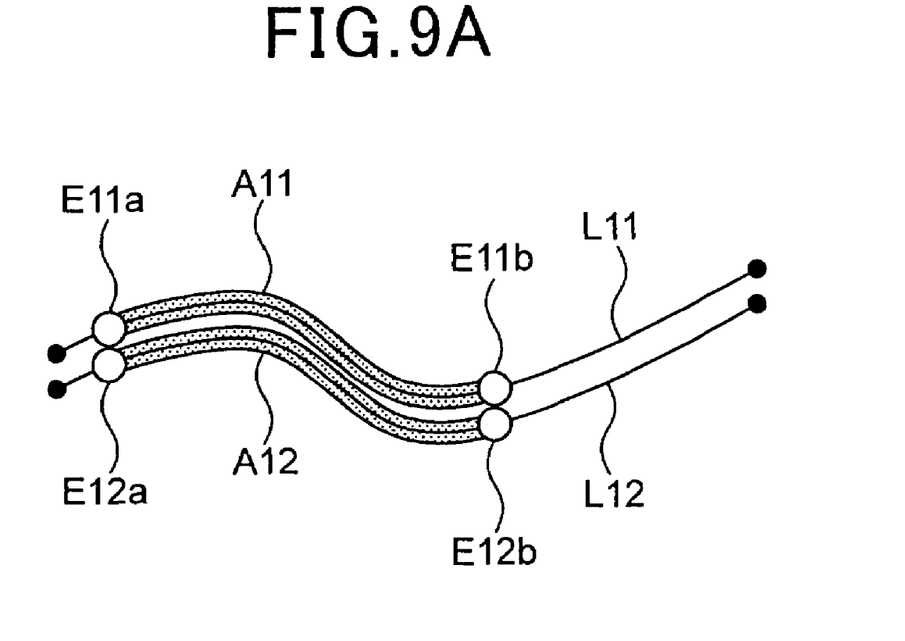
FIGS. 9A and 9B are diagrams showing a display example of a tunnel symbol in the case where a plurality of tunnel mouths exist within a predetermined distance.
Figure 9B:
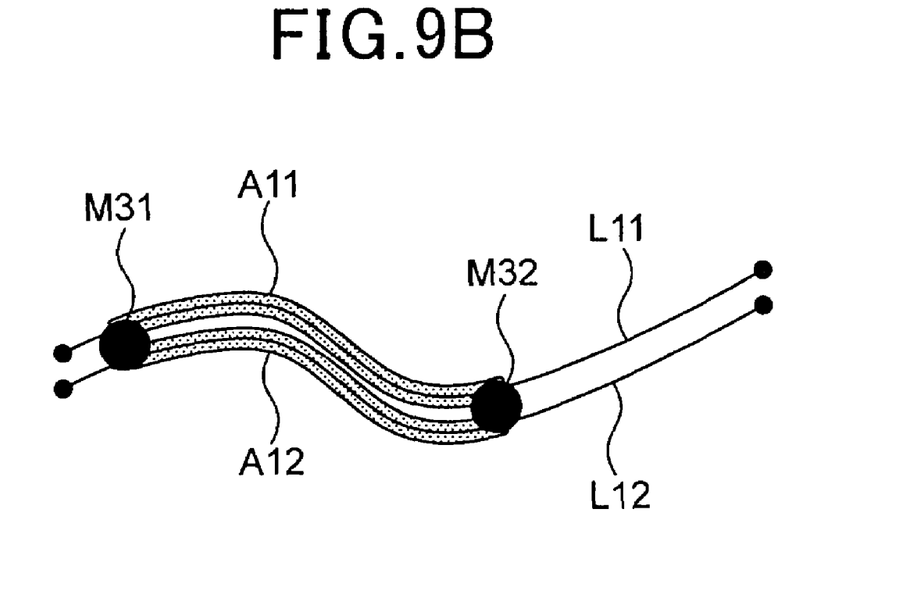

FIG. 6 is a diagram showing a display example of a tunnel symbol. FIGS. 7A and 7B are diagrams showing a display example of a tunnel symbol in the case where the same in-link attribute ID is set. FIG. 8 is a diagram showing an example of setting annotation types. FIG. 9 is a diagram showing a display example of the tunnel symbol in the case where a plurality of tunnel mouths exist within a predetermined distance.

The system controller 11 generates annotation data for displaying a tunnel symbol (an example of the symbols) indicative of a tunnel mouth in the position where the tunnel mouth exists on a roadmap on the basis of the link data and the in-link attribute data. For example, in the case where the link L and the in-link attribute A are in the state shown in FIG. 3 and the in-link attribute A is a tunnel, as shown in FIG. 6, annotation data are generated for a tunnel symbol M so that the tunnel symbol M is displayed at both ends of the in-link attribute A, that is, the positions of the tunnel mouths.

Concretely, the system controller 11 specifies the positions of both ends of a tunnel to which the in-link attribute data correspond on the basis of the in-link attribute shape of the in-link attribute data, generates annotation data for each of the specified end points, and sets position information of the specified end point in the annotation true position shape of the annotation data. More specifically, for example, when the in-link attribute shape is constructed by a coordinate string, the coordinates positioned at the head of the coordinate string are set as the coordinates at the start point of the tunnel, and the coordinates positioned at the end of the coordinate string are set as the coordinates at the end point of the tunnel.

In this case, the system controller 11 regards a plurality of tunnels associated with the same link L and belonging to the same group as a single tunnel, and specifies the positions of both ends of the tunnel. For example, as shown in FIG. 7A, in the case where tunnels A1 to A5 are associated with the link L1 (the object ID of the link L1 is set as the corresponding link ID) and the same in-link attribute IDs of the tunnels A1 to A5 match each other, as shown in FIG. 7B, the system controller 11 interpolates the tunnels in accordance with the road link shape of the associated link L1, specifies the positions of tunnel mouths E1a and E5b as both ends, and generates annotation data so that tunnel symbols M1 and M2 are displayed in the specified positions.

The system controller 11 calculates tunnel length on the basis of the in-link attribute shape of in-link attribute data, and sets "no display" or "symbol only" as the display type at each of the scales in correspondence with the tunnel length. More specifically, for example, when the in-link attribute shape is constructed by a coordinate string, the distance between two points is calculated on the basis of neighboring coordinate strings, and the calculated distance of the two points is integrated, thereby calculating tunnel length.

For example, when the tunnel length is 1600 m or longer, "symbol only" is set as the display type of all of the scales. In the case where the tunnel length is less than 1600 m and is equal to or longer than 800 m, "no display" is set as the scale-1 display type, and "symbol only" is set as the scale-2 to scale-4 display types. In the case where the tunnel length is less than 800 m and is equal to or longer than 400 m, "no display" is set as the scale-1 and scale-2 display types, and "symbol only" is set as the scale-3 and scale-4 display types. In the case where the tunnel length is less than 400 m and is equal to or longer than 200 m, "no display" is set as the scale-1 to scale-3 display types, and "symbol only" is set as the scale-4 display type. In the case where the tunnel length is less than 200 m, no tunnel symbol is displayed, so that annotation data corresponding to the tunnel mouth E is not generated.

Further, the system controller 11 sets the detailed type of a tunnel by annotation types in accordance with the road types of the link L with which the tunnel is associated. For example, as shown in FIG. 8, highway road, urban express way, toll national road, national road, toll main road, main road, toll prefectural road, prefectural road, other toll roads, and other roads are set. For those roads, the kinds (designs) of the tunnel symbols are displayed and the display priority at the time of displaying the tunnel symbols is also shown. The highest priority is placed on the highway road, and the lowest priority is placed on the other roads.

Further, for example, as shown in FIG. 9A, in the case where tunnel mouths (E11a and E12a, and E11b and E12b) of different tunnels (A11 and A12) are close to each other and the plurality of tunnel mouths exist in positions such that, when tunnel symbols are displayed for the tunnel mouths in map display at the scale 4, the symbols overlap each other (in the case where the tunnel mouths are positioned within a predetermined distance), the system controller 11 generates annotation data so that one tunnel symbol (M31 and M32) is displayed in an intermediate point of neighboring tunnel mouths as shown in FIG. 9B.

In the case where annotation types (the kinds of tunnel symbols) corresponding to both tunnel mouths are different from each other, the annotation type having higher display priority is set as annotation data. In this case, the tunnel symbol may be displayed in the position of higher display priority not in the intermediate point of both tunnel mouths.

Further, in the case where a plurality of tunnel mouths exist in positions where a plurality of tunnel symbols overlap each other in map display at scales 1 to 3, the system controller 11 sets "no display" as the scale display type for annotation data of the tunnel mouth having the annotation type of lower display priority (in the case where the display priority is the same, one of display types is set to "no display").

The various programs may be, for example, recorded on a recording medium such as a CD-ROM and read via the optical disk drive 13, or downloaded from a predetermined server via the communication unit 16.

2. Operation of Annotation Data Generating Apparatus

Next, the operation of the annotation data generating apparatus S will be described with reference to FIGS. 10 and 11.

Figure 10:
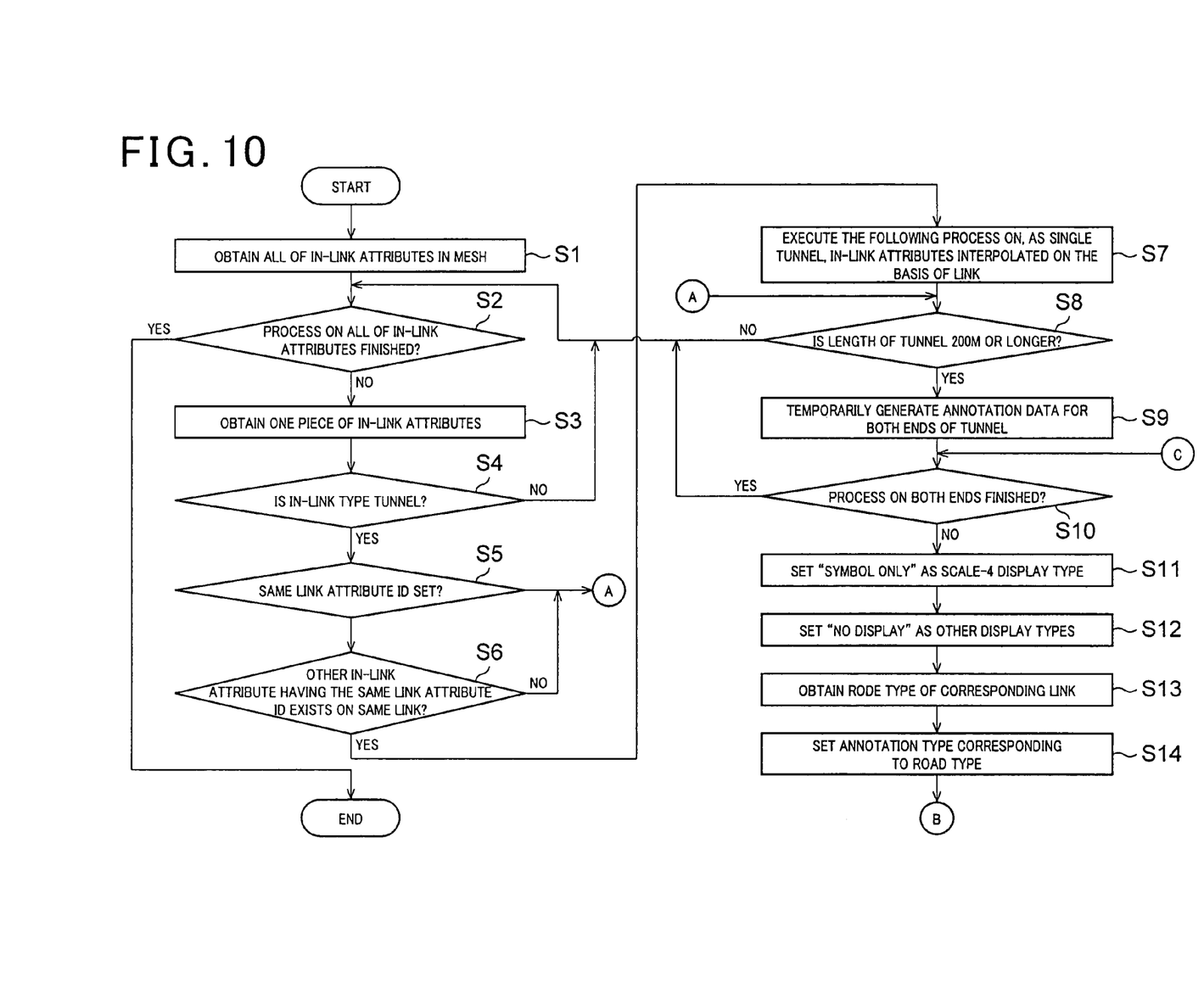
FIG. 10 is a flowchart showing a process example of a system controller 11 in the annotation data generating apparatus S of the embodiment.
Figure 11:
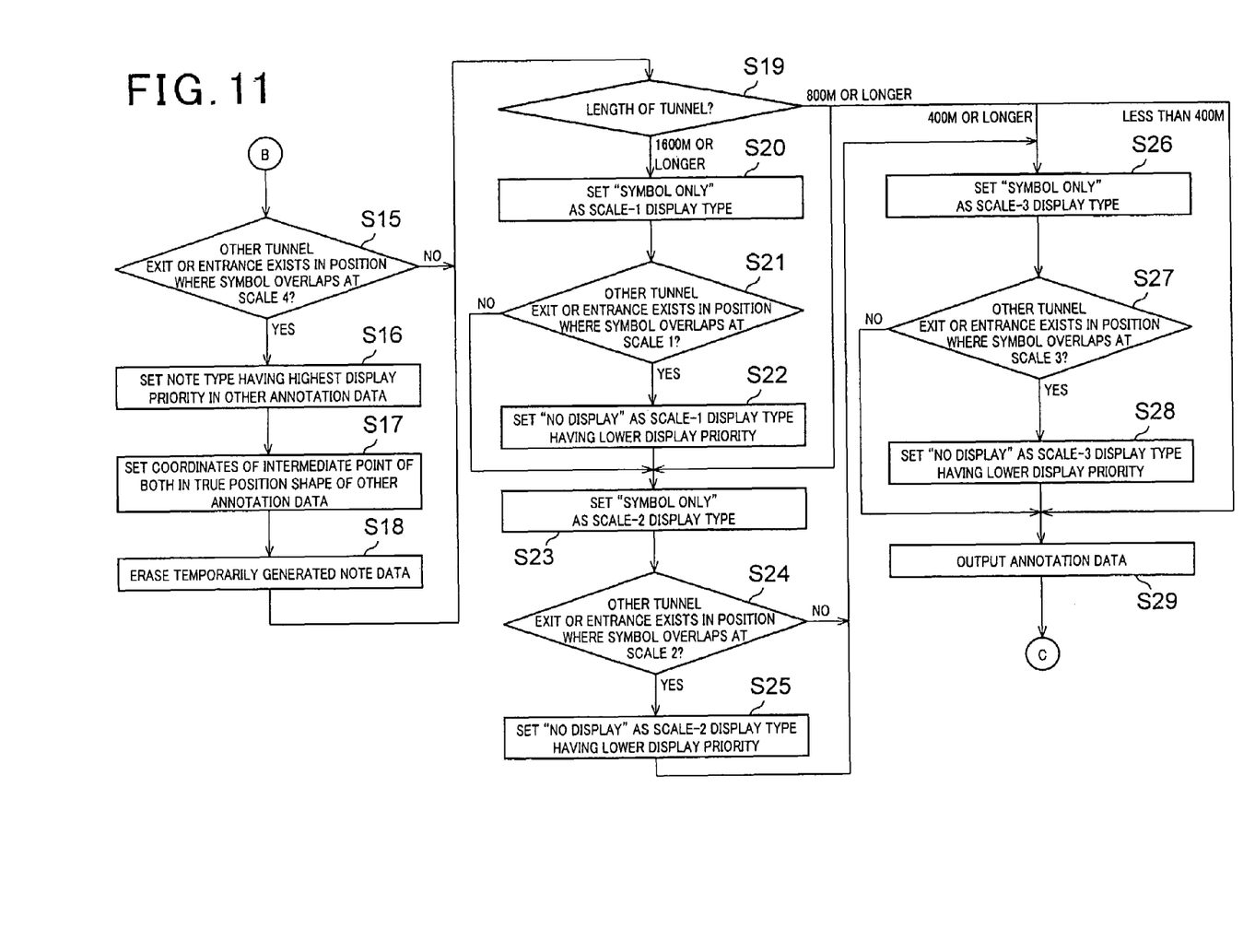
FIG. 11 is a flowchart showing a process example of the system controller 11 in the annotation data generating apparatus S of the embodiment.

FIGS. 10 and 11 are flowcharts showing a process example of the system controller 11 in the annotation data generating apparatus S of the embodiment.

As shown in FIG. 10, the system controller 11 obtains all of in-link attribute data existing in the same mesh from the storage 12 (step S1).

Next, the system controller 11 determines whether the process on the all of in-link attribute data has finished or not (step S2). When the process has not finished yet (NO in step S2), the system controller 11 reads one piece of in-link attribute data from the obtained in-link attribute data, and copies it onto the RAM (step S3).

The system controller 11 determines whether the in-link type of the read in-link attribute data is a tunnel or not (step S4). When the in-link type is not a tunnel (NO in step S4), the system controller 11 moves to step S2. When the in-link type is a tunnel (YES in step S4), the system controller 11 determines whether the same in-link attribute is set or not (step S5).

In the case where the same in-link attribute ID is set (YES in step S5), the system controller 11 determines whether another in-link attribute having the coincided corresponding link ID and the coincided same in-link attribute exists in the same mesh or not (step S6). When such another in-link attribute exists (YES in step S6), as described in the FIG. 7 the in-link attribute data are controlled so as to interpolate tunnels on the basis of the associated link L (step S7) and execute the processes in step S8 and subsequent steps for a single tunnel.

On the other hand, in the case where the same link attribute ID is not set (NO in step S5), the case where no in-link attribute data having the coincided corresponding link ID exists, or the case where no in-link attribute data having the coincided same in-link attribute exists (NO in step S6), the system controller 11 moves to step S8.

The system controller 11 calculates the tunnel length on the basis of the in-link attribute shape of the in-link attribute data and determines whether the tunnel length is 200 m or more (step S8). When the tunnel length is less than 200 m (NO in step S8), the system controller 11 moves to step S2.

On the other hand, when the tunnel length is 200 m or more (YES in step S8), annotation data are temporarily generated on the RAM in correspondence with both ends of the tunnel, that is, the start point and the end point, and sets the annotation true position shape in each of the positions of the start and end points of the tunnel specified on the basis of the in-link attribute shape of the in-link attribute data. The following process is executed in order on the start point and the end point.

Subsequently, the system controller 11 determines whether the process on both ends has been finished or not (step S10). When the process has not been finished yet (NO in step S10), the system controller 11 sets "symbol only" as the scale-4 display type of the annotation data (step S11), and sets "no display" as the initial value of the display type of the scales 1 to 3 (step S12).

The system controller 11 obtains the road type of the link data indicated by the corresponding link ID of the in-link attribute data (step S13), and sets the type of the tunnel symbol corresponding to the road type as the annotation type (step S14).

After that, as shown in FIG. 11, the system controller 11 retrieves generated annotation data and determines whether or not another tunnel mouth exists in the position where the tunnel symbol overlaps in the map display at the scale 4 on the basis of the annotation true position shape (step S15). When another tunnel mouth does not exist (NO in step S15), the system controller 11 moves to step S19. When another tunnel mouth exists (YES in step S15), the system controller 11 moves to step S16.

In step S16, the system controller 11 sets, as generated annotation data, the annotation type having higher display priority from the annotation type of the retrieved generated annotation data and the annotation type of the temporarily generated annotation data.

Subsequently, the system controller 11 calculates the position of an intermediate point between the position of the tunnel mouth indicated by the true position shape of the generated annotation data and the position of the tunnel mouth indicated by the true position shape of the temporarily generated annotation data, and sets the calculated position of the intermediate point as the true position shape of the generated annotation data (step S17).

The system controller 11 erases the temporarily generated annotation data (step S18) and moves to step S19.

The system controller 11 determines the tunnel length (step S19). When the tunnel length is 1600 m or longer (1600 m or longer in step S19), the system controller 11 moves to step S20. When the tunnel length is less than 1600 m and is equal to or longer than 800 m (800 m or longer in step S19), the system controller 11 moves to step S23. When the tunnel length is less than 800 m and is equal to or longer than 400 m (400 m or longer in step S19), the system controller 11 moves to step S26. When the tunnel length is less than 400 m (less than 400 m in step S19), the system controller 11 moves to step S29.

In step S20, the system controller 11 sets "symbol only" as the scale-1 display type, retrieves generated annotation data, and determines whether another tunnel mouth exists in the position where the tunnel symbol overlaps in the map display at the scale 1 or not (step S21). When another tunnel mouth does not exist (NO in step S21), the system controller 11 moves to step S23. When another tunnel mouth exists (YES in step S21), the system controller 11 sets "no display" as the scale-1 display type of the annotation type having lower display priority of the annotation type of the retrieved generated annotation data or the annotation type of the temporarily generated annotation data (step S22) and, after that, moves to step S23.

In step S23, the system controller 11 sets "symbol only" as the scale-2 display type in a manner similar to the case of the scale 1. After that, the system controller 11 retrieves the generated annotation data, and determines whether or not another tunnel mouth exists in the position where the tunnel symbol overlaps in the map display at the scale 2 (step S24). When another mouth does not exist (NO in step S24), the system controller 11 moves to step S26. When another mouth exists (YES in step S24), the system controller 11 sets "no display" as the scale-2 display type having lower display priority of the annotation type of the retrieved generated annotation data or the annotation type of the temporarily generated annotation data (step S25). After that, the system controller 11 moves to step S26.

In step S26, in a manner similar to the case of the scale 1 and scale 2, the system controller 11 sets "symbol only" as the scale-3 display type, retrieves the generated annotation data, and determines whether or not another tunnel mouth exists in the position where the tunnel symbol overlaps in the map display at the scale 3 (step S27). When another mouth does not exist (NO in step S27), the system controller 11 moves to step S29. When another mouth exists (YES in step S27), the system controller 11 sets "no display" as the scale-3 display type having lower display priority of the annotation type of the retrieved generated annotation data or the annotation type of the temporarily generated annotation data (step S28). After that, the system controller 11 moves to step S29.

In step S29, the system controller 11 outputs the temporarily generated annotation data to the storage 12, concludes generation of the annotation data, and moves to step S10.

The system controller 11 executes the steps S10 to S29 on the start and end points of the tunnel and determines in step S10 that the processes on both ends have been finished (YES in step S10), and moves to step S2.

After execution of the steps S2 to S29 on all of in-link attribute data, the system controller 11 determines in step S2 that the processes on the all of in-link attribute data are finished (YES in step S2) and finishes the process.

As described above, in the embodiment, when the in-link type of the in-link attribute data is a tunnel, the system controller 11 specifies the positions of both ends of the tunnel on the basis of the annotation true position shape of the in-link attribute data, and generates the annotation data for displaying the tunnel symbol in correspondence with each of the specified both ends.

Therefore, annotation data displaying a tunnel symbol in a proper position on a road map can be efficiently generated without a manual work.

The system controller 11 calculates tunnel length on the basis of the annotation true position shape of in-link attribute data and sets the display type on each scale on the basis of the tunnel length. Thus, annotation data which whether the tunnel symbol is displayed or not is properly set on each of the scales in, can be generated in accordance with predetermined specifications or the like.

Further, with respect to a plurality of tunnels having the same corresponding link ID and the same in-link attribute ID, the system controller 11 sets the tunnels as a single tunnel along the associated link L, specifies the positions of both ends of the tunnel, and generates annotation data for each of the positions of the specified start and end points. Consequently, the plurality of tunnels can be set as a single tunnel, and the tunnel mouths of the single tunnel can be displayed. Moreover, the tunnel symbol can be displayed so as to be easily seen by the user of a navigation system.

Further, when tunnel mouths of different tunnels are close to each other in a range such that, if tunnel symbols are displayed for both of the tunnel mouths, the tunnel symbols overlap each other, the system controller 11 generates a single piece of annotation data for both of the tunnel mouths. Therefore, the tunnel symbol can be displayed so that the user of a navigation system can easily see it.

Further, in the case where the system controller 11 sets the annotation type corresponding to the road type of corresponding link data in the annotation data and tunnel mouths of different tunnels exist in the range, the system controller 11 sets the annotation type having higher display priority of annotation data corresponding to the both tunnels. Thus, a tunnel symbol having higher importance can be properly displayed.

In the foregoing embodiment, the case of applying the present invention to a facility provided along a road has been described. The invention may be also applied to, for example, a tunnel or the like provided along a railway line. The facility to which the annotation symbol is displayed is not limited to a tunnel but may be a bridge and the like.

Although the case of applying the present invention to a road map displayed in a navigation system has been described in the foregoing embodiment, the invention may be applied to a map displayed in another system.

It should be understood that various alternatives to the embodiment of the invention described herein may be employed in practicing the invention. Thus, it is intended that the following claims define the scope of the invention and that methods and structures within the scope of these claims and their equivalents be covered thereby.

The entire disclosure of Japanese Patent Application No. 2006-118842 filed on Apr. 24, 2006 including the specification, claims, drawings and abstract is incorporated herein by reference in its entirety.

What is claimed is:

1. An information generating apparatus for, when a map image including a road is displayed on the basis of map data, generating symbol data for displaying a symbol indicative of a starting/ending point of a predetermined facility provided along a road, in a position where at least one of points of a starting point and an ending point of the facility exists,
    wherein the map data include road data specifying position and shape of a road and facility data associated with the road data and having position information and shape information of the predetermined facility provided along at least a part of a road to which the road data correspond, and
    the apparatus comprises:
    a starting/ending point specifying device which specifies the position of the starting/ending point of the predetermined facility on the basis of the position information and the shape information of the facility data, and at least the shape of the road specified by the road data; and
    a generating device which generates the symbol data in correspondence with the specified position of the starting/ending point.

2. The information generating apparatus according to claim 1,
    wherein the symbol data include display information indicating whether the symbol is displayed or not on each of a plurality of scales of the map image,
    the apparatus further comprises a facility length specifying device which specifies length of the facility on the basis of the shape information of the facility data, and
    the generating device sets the display information in the symbol data on the basis of the specified length of the facility.

3. The information generating apparatus according to claim 1, wherein the facility data include group identification information indicative of a group in which the facility data are included, and wherein, for a plurality of pieces of facility data associated with the same road data and indicated to be included in the same group by the group identification information, the end point specifying device specifies the position of the end point in a state where the predetermined facility to which the plurality of pieces of facility data correspond is set as a single predetermined facility along a road to which the associated road data correspond, and the generating device generates the symbol data for each of positions of end points of the specified single predetermined facility for the plurality of pieces of facility data.

4. The information generating apparatus according to claim 1, further comprising a determining device which determines whether the one end point specified on the basis of one piece of the facility data and the another end point specified on the basis of another piece of the facility data are positioned within a predetermined range or not, and wherein, when it is determined that the one end point and the another end point are positioned within the predetermined range, the generating device generates one piece of the symbol data in correspondence with the both end points.

5. The information generating apparatus according to claim 4, wherein the road data include road type information indicative of type of a road, and the symbol data include symbol type information indicative of type of the symbol, the generating device sets, as the symbol data, the symbol type information corresponding to the road type information of the road data with which the facility data are associated, and in the case where it is determined that the one end point and the another end point are positioned in a predetermined range, the generating device sets, as the single symbol data, the symbol type information corresponding to road type information of higher display priority, which is either road type information of the road data with which the one piece of the facility data is associated and road type information of the road data with which the another facility data are associated.

6. A recording medium where an information generating program is recorded so as to be able to be read by a computer included in an information generating apparatus, wherein, when a map image including a road is displayed on the basis of map data which include road data specifying position and shape of a road and facility data associated with the road data and having position information and shape information of a predetermined facility provided along at least a part of a road to which the road data correspond, the information generating apparatus generates symbol data for displaying a symbol indicative of a starting/ending point of the predetermined facility in a position where at least one of points of a starting point and an ending point of the facility exists, wherein the program makes the computer function as:

a starting/ending point specifying device which specifies the position of the starting/ending point of the predetermined facility on the basis of the position information and the shape information of the facility data, at least the shape of the road specified by the road data; and a generating device which generates the symbol data in correspondence with the specified position of the starting/ending point.

7. An information generating method of, when a map image including a road is displayed on the basis of map data, generating symbol data for displaying a symbol indicative of a starting/ending point of a predetermined facility provided along a road, in a position where at least one of points of a starting point and an ending point of the facility exists, wherein the map data include road data specifying position and shape of a road and facility data associated with the road data and having position information and shape information of the predetermined facility provided along at least a part of a road to which the road data correspond, and the method comprises:

a starting/ending point specifying process of specifying the position of the starting/ending point of the predetermined facility on the basis of the position information and the shape information of the facility data, and at least the shape of the road specified by the road data; and a generating process of generating the symbol data in correspondence with the specified position of the starting/ending point.

8. The information generating apparatus according to claim 1, wherein the shape information of the facility data includes a coordinate string from a predetermined reference position, and coordinates positioned at a head of the coordinate string are set as the starting point of the facility and coordinates positioned at an end of the coordinate string are set as the ending point of the facility.

9. The information generating apparatus according to claim 1, wherein the starting/ending point are located on the facility and are provided along the road.

10. The information generating apparatus according to claim 1, wherein the facility is provided along at least a part of the road such that at least a part of the facility and at least the part of the road overlap one another.

11. The information generating apparatus according to claim 10, wherein the facility is selected from at least one of a tunnel, a bridge, a cave mouth, a railroad crossing, and an underpass.

* * * * *